G. R. STEELE.
LEDGER SHEET.
APPLICATION FILED JAN. 20, 1914.

1,203,804.

Patented Nov. 7, 1916.

Fig. 1.

Fig. 2.

Witnesses.
J. Morrill Fuller
William E. Gagen

Inventor.
George R. Steele,
by Heard Smith & Tennant.
Att'y's

UNITED STATES PATENT OFFICE.

GEORGE R. STEELE, OF NEWTONVILLE, MASSACHUSETTS.

LEDGER-SHEET.

1,203,804.   Specification of Letters Patent.   Patented Nov. 7, 1916.

Application filed January 20, 1914. Serial No. 813,309.

*To all whom it may concern:*

Be it known that I, GEORGE R. STEELE, a subject of the King of Great Britain, residing at Newtonville, county of Middlesex, State of Massachusetts, have invented an Improvement in Ledger-Sheets, of which the following description, in connection with the accompanying drawing, is a specification, like characters on the drawing representing like parts.

This invention relates to improvements in a ledger sheet for a vertical filing system or a loose leaf ledger system of bookkeeping, the sheet being particularly adapted to be used with computing machines having printing mechanism adapted to record entries of debits, credits, and balances.

In the usual system of bookkeeping the ledger entries are made from day to day, statements of the account being drafted therefrom usually at the end of the month and mailed to the customers. The work attendant upon the drafting of such statements is usually so great as to require overtime work at the end of each month and to frequently necessitate the employment of an additional force.

One object of the present invention is to provide a combined ledger sheet and statement on which the daily account may be entered in duplicate to show the charges, the credit entries and the balance of the account at the close of business each day and which will contain such other information as is found necessary or desirable, the portion of the leaf containing the duplicate entries being detachable to serve as a statement to be mailed to the customer, thus saving the time which is required to make out the statement of account when the same is to be rendered to the customer.

Another object of the invention is to provide a duplicate ledger sheet from which a portion may be removed to be used as a statement of account in the manner aforesaid but which will leave a stub adapted to contain confidential information or data relating to the account, said stub being provided with suitable means by which it may be secured in a filing case.

Another object of the invention is to effect the saving of time which would be required for the insertion and removal of carbon sheets in the ordinary methods of duplication by coating the reverse side of the original leaf with carbon or other suitable transfer material, preferably prepared so as not to "smut" in ordinary usage.

Other objects of the invention and the nature thereof will more fully appear from the following description and the accompanying drawings and will be pointed out in the annexed claims.

In the drawings, Figure 1 is a perspective view of a ledger sheet embodying my invention the original leaf being turned up to show the coating on the reverse side thereof and also to exhibit the under or duplicate leaf. Fig. 2 is a view of the duplicate leaf showing a portion of the reverse side of the original leaf.

The preferred form of my invention which is illustrated in the accompanying drawings comprises a pair of duplicate ledger leaves, an original 1, and a duplicate 2 which preferably are formed from a single sheet of paper folded across the middle and so printed that the fold 3 extends along the vertical, or longitudinal edge of the sheet to give rigidity to the sheet for purposes which will be hereinafter more fully explained.

The original and the duplicate leaves may be printed to contain columns and titles therefor together with such additional data as may be desirable in a particular business. The right hand portions of the leaves are preferably arranged to present statements of account, 4, 5, one of which is adapted to be furnished to the customer. The remaining portions 6, 7, of the respective leaves at the left of said statement may contain such data confidential or otherwise, as may be desirable or useful in connection with the record of the account. A perforated or weakened line 8 is preferably provided between the statement 5 of the duplicate leaf and the portion 7 whereby the statement may be detached.

As illustrated herein the statement is preferably provided with the usual business heading, lines for the account number, the name and address of the customer, and suitable columns for the entry of the dates of the several accounts, the charges, credits and balance. It is desirable that the lines for the name and address of the customer be so disposed thereon that the leaf may be folded for insertion in a "window" envelop thereby saving the time required in addressing envelops for mailing such statements and avoiding mistakes in transcribing.

The portions 6, 7 of the duplicate leaves at the left of the statement portions as illustrated in the drawing are provided with spaces and columns for the entry of confidential data, such for example as, "Rating," "Reference," "Limit of Credit," "Purchasing Agent," "Salesman," and columns for "proof" of the particular items of account and "folio" numbers thereof.

It will be obvious that the original or permanent ledger leaf will retain all the above data and that the stubs 7 of the duplicate leaf may be separated from the original and kept in a suitable separate file, or the stubs may be permitted to remain with the original.

In order to adapt the sheet for filing in a vertical filing system the lower edges of the duplicate sheets are preferably provided with perforations or notches 9 adapted to be engaged by the locking members of the file, and it has been found expedient that the stub of the duplicate leaf remaining after the removal of the statement portion should have a full complement of such retaining apertures so that uniform files may be used for the sheets and stubs, or if the stubs of the duplicate sheet are not detached from the original to maintain the locked ends of the sheets of even thickness in the file. A transverse perforated line 10 is therefore provided near the base of the duplicate leaf so that when the statement is torn off a transverse stub having locking apertures will remain. Vertical perforations along the line of fold may be provided also if desired to permit the separations of the original from the duplicate sheet or the stub thereof.

In order to save time in the use of ledger sheets of the character above described the use of a separate carbon sheet is preferably avoided by providing the reverse side of the original leaf with a coating of carbon or other suitable material extending over the entire area thereof, so that in the use of the ledger sheet it is merely necessary to insert the same into the machine, make the desired entries, remove the sheet from the machine and refile it, or at the end of the month to tear off the statement fold the latter and insert the same in a "window" envelop and file the original and stub, either together or separately.

It is particularly desirable that the ledger sheet be so folded that the line of fold shall be vertical, or parallel to the columns of the sheet where the same is to be used in a computing machine or a typewriting machine, as the fold gives strength and stiffness to the sheet which enables it to be more easily inserted in the machine, and also serves to maintain the printed matter on the original and duplicate sheet correctly superposed.

Another advantage residing in the construction above described is that an exact duplication of the original is insured by reason of the fact that the entire reverse side of the original is coated with transfer material, and the duplicate leaf is permanently attached to the original in such a manner that no entry can be made by a machine upon the original without appearing also on the duplicate. Any failure of entry which might occur if the original and duplicate were separate is thus avoided.

It is to be understood that the particular arrangement of columns and the character of data indicated upon the sheet may be varied to accord with the business in which the sheet is to be used and that the size and shape of the sheet is not material to this invention.

Various modifications may therefore be made within the scope of my invention.

Having fully described my invention what I claim as new and desire to secure by Letters Patent is:

1. A loose leaf ledger sheet and statement adapted for a vertical filing system comprising a single sheet of paper folded transversely of the center of its width to form an original leaf and a duplicate leaf, said leaves being provided with duplicate printed matter and columns for business entries adapted to be superposed in the folded sheet, each sheet having at its end printed matter and columns arranged to present a statement of account and adjacent the fold printed matter and columns for confidential entries, the duplicate sheet being provided with a weakened line along the side of the statement whereby said statement may be detached.

2. A loose leaf ledger sheet and statement adapted for a vertical filing system comprising a pair of leaves formed from a single sheet of paper transversely folded to form an original leaf and a duplicate leaf, the fold extending longitudinally thereof, said leaves being provided with printed matter and columns for business entries adapted to be superposed in the folded sheet, the original leaf being coated on the reverse side with a transfer material, one portion of the printed matter and the columns being arranged to present a statement of account, the other portion thereof being arranged for confidential entries, a perforated line parallel to said fold interposed between the statement of account and the confidential memoranda and a transverse perforated line arranged between the statement portion and the stub portion whereby the statement may be detached and leave the stub for a permanent record.

In testimony whereof, I have signed my name to this specification, in the presence of two subscribing witnesses.

GEORGE R. STEELE.

Witnesses:
FREDERICK A. TENNANT,
THOMAS J. DRUMMOND.

Copies of this patent may be obtained for five cents each, by addressing the "Commissioner of Patents, Washington, D. C."